(12) United States Patent
Baldovino et al.

(10) Patent No.: US 8,859,081 B2
(45) Date of Patent: Oct. 14, 2014

(54) TOOTHED BELT COMPRISING A RESISTANT LAYER AND RESISTANT LAYER THEREOF

(75) Inventors: Carlo Baldovino, Pescara (IT); Adriano Rolando, Valperga Canavese (IT)

(73) Assignee: Dayco Europe S.r.l., Chieti (IT)

( * ) Notice: Subject to any disclaimer, the term of this patent is extended or adjusted under 35 U.S.C. 154(b) by 878 days.

(21) Appl. No.: 12/679,992

(22) PCT Filed: Sep. 25, 2008

(86) PCT No.: PCT/IB2008/002493
§ 371 (c)(1),
(2), (4) Date: Jun. 23, 2010

(87) PCT Pub. No.: WO2009/040640
PCT Pub. Date: Apr. 2, 2009

(65) Prior Publication Data
US 2010/0255259 A1   Oct. 7, 2010

(30) Foreign Application Priority Data
Sep. 26, 2007   (IT) .............................. TO2007A0675

(51) Int. Cl.
| | | |
|---|---|---|
| *B32B 3/28* | (2006.01) | |
| *C08L 55/00* | (2006.01) | |
| *F16G 1/00* | (2006.01) | |
| *F16G 5/00* | (2006.01) | |
| *F16G 1/28* | (2006.01) | |
| *F16G 5/20* | (2006.01) | |
| *C08K 5/098* | (2006.01) | |
| *B23B 3/30* | (2006.01) | |

(52) U.S. Cl.
CPC ................. *C08K 5/098* (2013.01); *B23B 25/14* (2013.01); *B23B 3/30* (2013.01); *F16G 1/28* (2013.01); *B32B 3/28* (2013.01)

USPC ........... 428/163; 524/565; 474/264; 474/265; 474/205; 474/91

(58) Field of Classification Search
None
See application file for complete search history.

(56) References Cited

U.S. PATENT DOCUMENTS

| | | | | |
|---|---|---|---|---|
| 6,153,686 A | * | 11/2000 | Granatowicz et al. | ........ 524/511 |
| 6,352,488 B1 | | 3/2002 | Morris et al. | |
| 2007/0135251 A1 | * | 6/2007 | Di Meco et al. | .............. 474/205 |

FOREIGN PATENT DOCUMENTS

| | | | | |
|---|---|---|---|---|
| EP | 0 452 488 A | 10/1991 | | |
| EP | 1 052 425 A | 11/2000 | | |
| EP | 1 157 813 A | 11/2001 | | |
| EP | 1 637 767 A | 3/2006 | | |
| WO | WO 2005/080821 A | 9/2005 | | |
| WO | WO 2007/082920 | * | 7/2007 | ................ F16G 1/28 |
| WO | WO 2009/034422 A | 3/2009 | | |

* cited by examiner

*Primary Examiner* — David Sample
*Assistant Examiner* — Nicole T Gugliotta
(74) *Attorney, Agent, or Firm* — Frommer Lawrence & Haug LLP; Ronald R. Santucci

(57) ABSTRACT

There is described a toothed belt comprising an elastomeric material body, in which a plurality of longitudinal filiform resistant inserts is embedded, and a toothing coated by a coating fabric. A resistant layer that increases the resistance to abrasion and thus the resistance to wear of the toothed belt is adhered over the coating fabric. The resistant layer comprises a vulcanization agent and more than 75% of an elastomer formed by at least one copolymer modified with an unsaturated carboxylic acid salt and obtained from a dien monomer and a nitrile group-containing monomer. The resistant layer is advantageously separated from the fabric and is calendered on the fabric itself.

12 Claims, 4 Drawing Sheets

Fig 5

| Examples | | | | % Abrasion (Cm3) compared to number 1 = 100 | abrasion TABER cm3 after 3000 cycles | ML(1+4) | Mm | t5 | ML | MH | t90 | Hardness | Break Stress | Break Strain | FRICTION COEFFICIENT | |
|---|---|---|---|---|---|---|---|---|---|---|---|---|---|---|---|---|
| | | | | TABER ABRASER 3000 CICLI PULEGGIE H22 | | MOONEY ASTM D1646 | MOONEY ASTM D1646 | | | | | ASTMD2240 | Traction ASTM D412 (DUMBELL H3) | | initial | after 20' |
| Number | phr | | | | | | | | | | | | | | | |
| | PTFE | MoS2 | Grafite | | | | | | | | | | | | | |
| 1 | 125 | 0 | 0 | 100 | 0,721 | 100 | 80 | 5,5 | 10 | 148 | 1,5 | 95 | 22 | 85 | 0,1 | 0,23 |
| 2 | 0 | 0 | 0 | -22 | 0,562 | 122,8 | 44,5 | 6 | 3,5 | 149,4 | 1,08 | 91 | 32 | 160 | 0,24 | 0,56 |

TOOTHED BELT COMPRISING A RESISTANT LAYER AND RESISTANT LAYER THEREOF

This application is a 371 of PCT/IB2008/002493 filed on Sep. 25, 2008, published on Apr. 2, 2009 under publication number WO 2009/040640 A which claims priority benefits of Italian Patent Application No. TO2007A 000675 filed Sep. 26, 2007, the disclosure of which is hereby incorporated by reference.

TECHNICAL FIELD

The present invention relates to a toothed belt or resistant layer used for the coating of a fabric for a toothed belt and to the toothed belt thereof.

BACKGROUND ART

Each component of the belt contributes to increasing the performance in terms of mechanical resistance, so as to decrease the risk of failure of the belt and to increase the specific transmissible power.

Cords especially contribute to ensuring the required mechanical characteristics for the belt and substantially contribute to the modulus of the belt itself and therefore specifically ensure the maintenance of the performance of the belt in the course of time. Cords are generally formed by twisting high-modulus fibres several times.

Cords are also normally treated with substances adapted to increase the compatibility of the fibres with the body compound that surrounds the cords themselves.

For example, the cords may be treated with elastomeric latexes that serve as "adhesives".

The body compound allows connecting the various elements and must have appropriate hardness and ensure that the various elements forming the belt itself synergically contribute to the final performance of the belt itself.

The body compounds contain one or more elastomeric materials possibly enriched with fibres to increase the hardness thereof. The coating fabric of the belts increases the resistance to abrasion and hence protects the working surface of the belt from wear due to rubbing between the sides and the tops of the belt teeth and the sides and the bottoms of the races of the pulley with which the belt interacts.

Furthermore, the coating fabric reduces the coefficient of friction on the working surface, reduces the deformability of the teeth and especially reinforces the root of the tooth thereby avoiding the failure thereof.

The coating fabric used may consist of a single layer or, alternatively, may be double-layered so as to ensure a greater sturdiness and stiffness.

The fabric is normally treated with an adhesive, for example resorcinol and formaldehyde latex (RFL) to increase adherence between the body and the fabric itself.

Moreover, a number of methods are employed to increase the resistance to wear of drive belts by modifying the structure of the coating fabric or performing different treatments on the fabric, for example, treatments where the fabric is treated with halogenated polymers, for example PTFE treatments.

Said treatments do not, however, lead to any great increase in resistance to wear as the coating fabric of the toothed belt, after a short time of use, again becomes the working surface and accordingly the surface exposed to wear.

Alternatively, treatments (also designated as adhesive compositions) for toothed belt fabrics including an anti-friction material selected from the group consisting of molybdenum sulphide and graphite are also known from patent applications JP2001304343 and JP2001208137 to MITSUBOSHI. However, said treatments are also applied to the threads of the fabric as a glue and do not form a separate layer and therefore these anti-friction materials also do not allow to obtain an optimal resistance to wear.

As a matter of fact, also in these cases the fabric is the actual working surface of the toothed belt, i.e. the surface that in use is in direct contact with the pulleys, and therefore also in this case the treatment allows to obtain only a slight increase of the resistance to abrasion and the belt is also very noisy, especially in the step of engaging the pulley.

To overcome such a problem it has been suggested to radically change the structure of the belt in patent EP1157813 in the name of the same applicant, where it is suggested to cover the coating fabric with a resistant layer comprising a fluorinated plastomer, an elastomeric material and a vulcanisation agent. The fluorinated plastomer is present in the resistant layer in a larger amount with respect to the elastomeric material so as to greatly facilitate the formation of an actual layer which is separate from the fabric.

The layer is distinct from the fabric, does not permeate in the fabric and is advantageously applied to the fabric by means of a calendering step. An adhesive layer is advantageously present between the fabric and the resistant layer.

The use of the resistant layer has allowed to obtain good results in terms of the increase in the resistance to wear, as the working surface of the belt is in this case formed by the resistant layer itself and not by the fabric, which has shown to be particularly resistant to wear and provides for a lower noisiness during the step of engaging the teeth of the belt on the pulley.

The resistant layer however has some drawbacks. Specifically, said layer comprises a fluorinated plastomer including particles which have a mean size of 20 µm or more and are in the form of agglomerates. Such agglomerates therefore have a size such as to imply a difficult miscibility with the elastomer in solution. The agglomerates are therefore also present in the final resistant layer which is therefore heterogeneous and such heterogeneity may generate a high noisiness during the use of the belt.

A further drawback consists in that the fluoropolymer is very expensive and a consistent addition of such a polymer results poorly cost-effective.

Alternative solutions are continuously sought for obtaining a coating layer for toothed belts allowing to provide a high resistance to wear in the whole range of operating temperatures of the belt and a low noisiness at low and high speeds at the same time.

DISCLOSURE OF THE INVENTION

It is the object of the present invention to therefore obtain a coating layer for a toothed belt and a toothed belt thereof with a high resistance to abrasion and therefore to wear and at the same time both a low noisiness during operation at high and low speeds and an optimal resistance in the whole range of use temperatures.

According to the present invention, this object is achieved by a toothed belt according to claim 1.

According to the present invention a process is also provided for the manufacture of a toothed belt according to claim 12.

BRIEF DESCRIPTION OF THE DRAWINGS

For a better understanding of the present invention, it is now also described with reference to the accompanying figures, in which:

FIG. 5 is a Table with the results of the tests performed on the treatments according to the invention and according to the known art.

DETAILED DESCRIPTION

Figure 1:
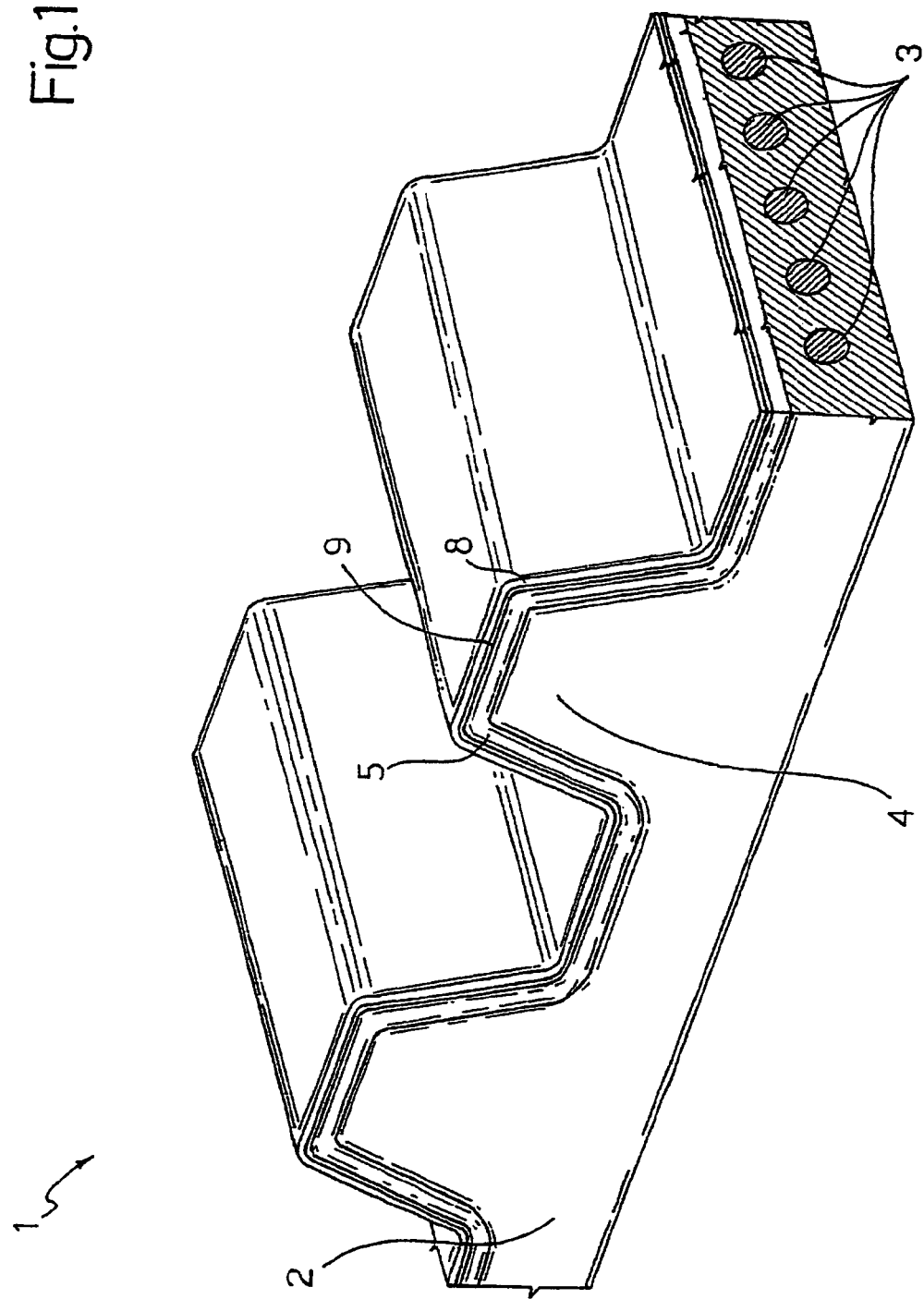
FIG. 1 is a partial perspective view of a toothed belt according to the present invention.
Figure 2:
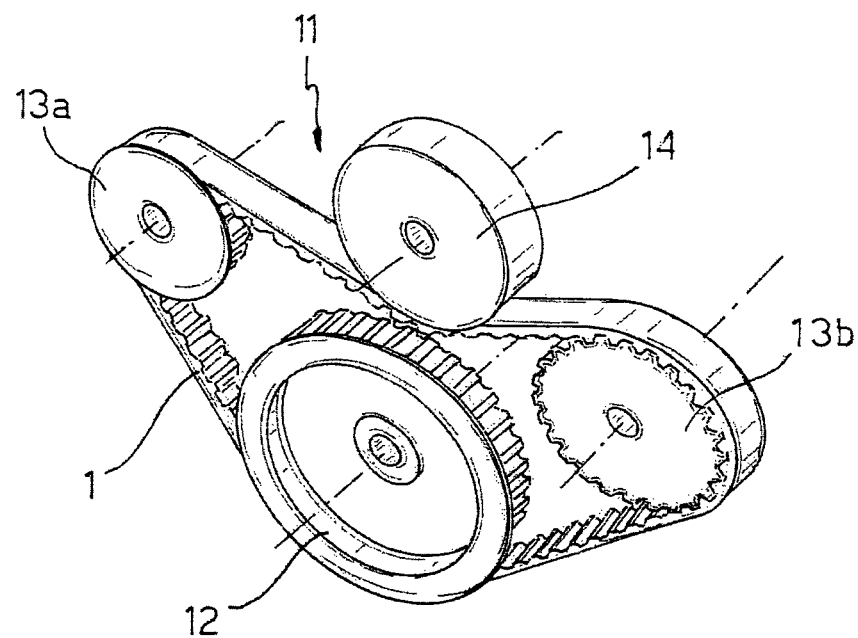
FIG. 2 is a diagram of a first timing control system using a first toothed belt according to the present invention.
Figure 3:
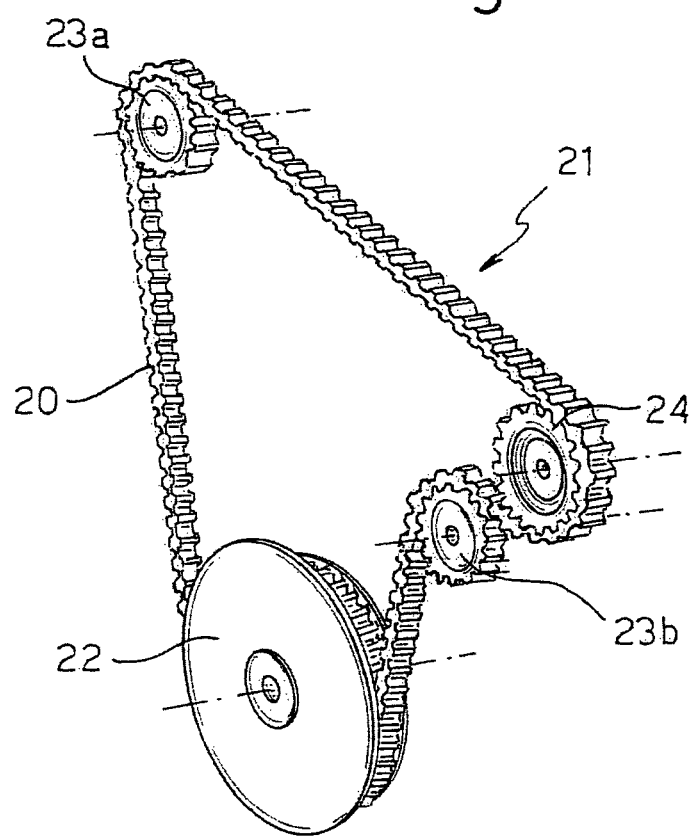
FIG. 3 is a diagram of a second timing control system using a second toothed belt according to the present invention.
Figure 4:
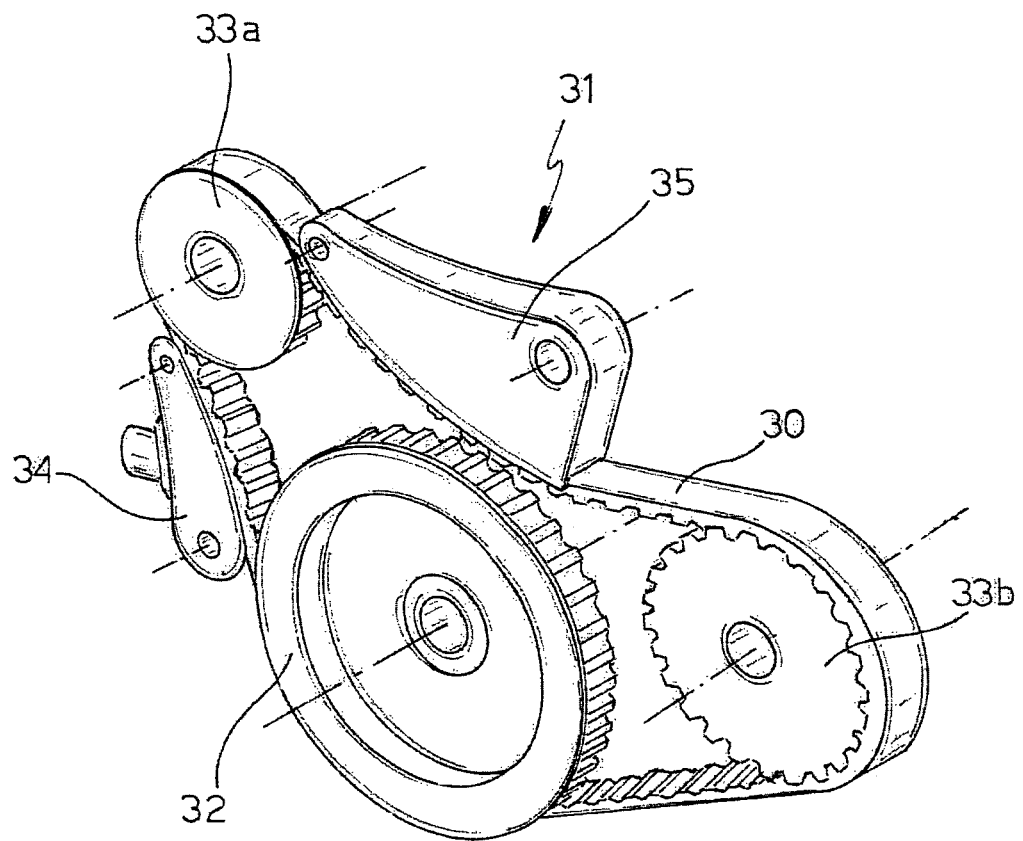
FIG. 4 is a diagram of a third timing control system using a third toothed belt according to the present invention.

FIG. 1 shows a toothed belt 1 as a whole. The belt 1 comprises a body 2 made of elastomeric material, in which a plurality of longitudinal filiform resistant inserts 3 is imbedded.

The body 2 has a toothing 4, which is coated by means of a coating fabric 5.

The body 2 is advantageously made of a compound consisting of one or more elastomers, which are for convenience indicated as a whole as "first elastomeric material". The "first elastomeric material substantially contains" one or more copolymers formed from a nitrile group-containing monomer and a diene in which the nitrile group-containing monomers are preferably in a percentage in the range between 30 and 39% in weight with respect to total final copolymers.

The "first elastomeric material substantially contains" means that small percentages of other polymers or copolymers may be added to the first elastomeric material without negatively affecting the chemical compatibility between the body compound and the other components of the toothed belt and therefore without departing from the scope of the present invention.

The copolymer/s used advantageously is/are hydrogenated butadiene acrylonitrile or HNBR.

Advantageously, the HNBR used has a high degree of hydrogenation, for example so-called totally saturated HNBRs—thus having a residual percentage of double bonds of 0.9% at most—may be used, although HNBRs with a lower degree of unsaturation—such as for example HNBRs with a degree of saturation of 40 or 5.5%, so-called partially saturated HNBRs—may be used as an alternative.

Some examples of HNBR copolymers that may be used as body compound, but also in different treatments of the various components of the toothed belt, are copolymers included in the family of THERBAN produced by Lanxess, such as THERBAN 3407 with 340 of nitrile groups and a degree of hydrogenation of at most 0.9%, THERBAN 3406 with 34% of nitrile groups and a degree of unsaturation of at most 0.9%, THERBAN 3607 with 36% of nitrile groups and a degree of unsaturation of at most 0.9%, THERBAN 3446 with 34% of nitrile groups and a degree of unsaturation of at most 4%, THERBAN 3447 with 34% of nitrile groups and a degree of unsaturation of at most 5.5%, THERBAN 3627 with 36% nitrile groups and a degree of unsaturation of at most 2%, THERBAN 3629 with 36% of nitrile groups and a degree of unsaturation of at most 2%, THERBAN 3907 with 39% of nitrile groups and a degree of unsaturation of at most 0.9%.

HNBRs produced by Nippon Zeon by the name ZETPOL may also be used as an alternative. Specifically, ZETPOL 2000 with 36% of nitrile groups and a degree of unsaturation of at most 0.9%, ZETPOL 2000L with 36% of nitrile groups and a degree of unsaturation of at most 0.9%, ZETPOL 2010 with 36% of nitrile groups and a degree of unsaturation of at most 4%, ZETPOL 2010L with 36% of nitrile groups and a degree of unsaturation of at most 4%, ZETPOL 2010H with 36% of nitrile groups and a degree of unsaturation of at most 4%, ZETPOL 2020 with 36% of nitrile groups and a degree of unsaturation of at most 5.5%, ZETPOL 2020L with 36% of nitrile groups and a degree of unsaturation of at most 5.5%.

The compound in the first elastomeric material may contain other conventional additives such as, for example, reinforcing agents, fillers, pigments, stearic acid, accelerators, vulcanisation agents, antioxidants, activators, initiators, plasticisers, waxes, prevulcanisation inhibitors, anti-degrading agents, process oils and the like.

Advantageously, carbon black may be used as a filler, advantageously added in amounts in the range between 0 and 80 phr, more advantageously approximately 40 phr. Advantageously, reinforcing white fillers such as talc, calcium carbonate, silica and silicates are advantageously added in an amount in the range between 0 and 80 phr, advantageously approximately 40 phr. Silanes may also advantageously be used in an amount in the range between 0 and 5 phr.

Advantageously, zinc oxide and magnesium oxide are added in an amount advantageously in the range between 0 and 15 phr.

Advantageously, ester plasticisers such as trimellitates or ether esters are added in an amount advantageously in the range between 0 and 20 phr.

Vulcanisation coagents such as triallylcyanurates, organic or inorganic methacrylates such as metal salts are advantageously added in an amount advantageously in the range between 0 and 20 phr or organic peroxides such as for example isopropyl benzene peroxide in an amount advantageously in the range between 0 and 15 phr.

The elastomeric material compound advantageously further comprises reinforcing fibres, more advantageously in an amount between 2 and 40 phr, even more advantageously 20 phr. The reinforcing fibres advantageously have a length in the range between 0.1 and 10 mm.

The use of fibres allows to further enhance the mechanical characteristics of the body compound.

The reinforcing fibres advantageously comprise aromatic polyamides, advantageously paramides, for example Technora© fibres, which may adhere to the compound by means of a resorcinol and formaldehyde latex (RFL) treatment, may advantageously be used. For example, the latex used may comprise a vinylpyridine-styrene-butadiene copolymer (VP-SBR).

Aramidic fibres have shown to be especially effective, such as for example Teijn's 1 mm-long Technora fibres.

The coating fabric 5 of the toothing 4 or the coating fabric of the back may comprise one or more layers and may, for example, be obtained by means of different weaving techniques, for example by means of the weaving technique known as 2× twill.

As an alternative, the coating fabric 5 may be obtained according to weaving modes allowing to obtain at least one rough surface to improve mechanical adhesion.

The coating fabric 5 of the teeth advantageously comprises aliphatic or aromatic polyamide, more advantageously aromatic polyamide (aramid).

The fabric used advantageously has a composite structure consisting of a weave and a warp, in which the weave consists of weave threads each formed by an elastic thread as a core and by at least one pair of composite threads wound on the elastic thread, each composite thread comprises a high thermal and mechanical resistance thread and at least one covering thread wound on the high thermal and mechanical resistance thread. Each composite thread advantageously includes a high thermal and mechanical resistance thread and a pair of covering threads wound on the high thermal and mechanical resistance thread. The elastic thread is advantageously polyurethane. The high thermal and mechanical resistance thread is advantageously made of para-aromatic polyamide.

Before forming the belt, the fabric 5 is treated by immersion in an aqueous solution of organic solvent or a mixture of water and solvent containing a composition comprising a second elastomeric material consisting of one or more copolymers formed from a nitrile group-containing monomer and a diene in which the nitrile group-containing monomers are advantageously in a percentage in the range between 30 and 39% in weight with respect to total final copolymers.

The fabric 5 advantageously consists of a polymer material, advantageously aliphatic or aromatic polyamide, even more advantageously high thermal resistance and high toughness polyamide 6/6.

According to the present invention a covering layer also designated as resistant layer 8 is placed over the fabric 5 and externally thereto.

The resistant layer 8 comprises a peroxide such as a vulcanisation agent. The peroxide is normally added in an amount in the range between 1 and 15 parts in weight with respect to 100 parts of elastomeric material. More advantageously, the peroxide is added in an amount in the range between 5 and 10 parts with respect to 100 parts of elastomeric material.

The toothed belt 1 is vulcanised according to common and known methods and therefore not disclosed in detail.

The resistant layer 8 comprises by at least 85% in weight a second elastomeric material formed by a mixture of one or more copolymers obtained form a dien monomer and a nitrile group-containing monomer modified with an unsaturated carboxylic acid salt and a vulcanisation agent.

Preferably, the resistant layer 8 substantially consists of the second elastomeric material.

"The resistant layer substantially consists of", in the scope of the present invention, means that the resistant layer may contain impurities or small percentages of another material without these substantially varying the resistance to wear and the friction coefficient of the resistant layer.

It has unexpectedly been found that, contrary to the teaching of the known art, the resistant layer 8 allows to achieve a good resistance to wear even without using an anti-friction material or using extremely limited amounts of such anti-friction materials.

The resistant layer 8 advantageously has no anti-friction materials.

The resistant layer 8 may however optionally include an anti-friction material in amounts smaller that 15 phr, advantageously in amounts smaller that 5 phr, without the addition of these anti-friction materials substantially modifying the resistance to wear of the resistant layer 8 itself. The anti-friction materials that are possibly used in small amounts are those known for the treatment of the coating fabric of toothed belts and therefore fluoropolymers, such as for example PTFE, molybdenum sulphide, graphite, copper powder.

The second elastomeric material advantageously consists of one or more copolymers formed from a nitrile group-containing monomer and a diene in which the monomers containing the nitrile groups are preferably in a percentage in the range between 30 and 39% in weight with respect to total final copolymers. The nitrile groups are more advantageously in a percentage in the range between 34 and 36% in weight with respect to total final copolymers.

According to the present invention at least one of the copolymers is modified with an unsaturated carboxylic acid salt. A zinc salt of polymethacrylate acid is advantageously used.

The second elastomeric material is advantageously HNBR modified with a zinc methacrylate also designated as zinc salt of polymethacrylate acid. The zinc salt of polymethacrylate acid is preferably added in an amount in the range between 10 and 60%.

HNBR modified with zinc salts advantageously has a Mooney viscosity in the range between 70 and 90.

HNBR modified with zinc salts advantageously has an unsaturation lower than 15 percent, more preferably between 5 and 10%.

For example, elastomers are advantageously used which are sold by Zeon with the names: ZSC 1295, ZSC 2095, ZSC 2195, ZSC 2295, ZSC 2295L, ZSC 2295R and ZSC 2395.

A resistant layer formed by ZSC 2195 is more preferably used.

The thickness of the resistant layer 8 is advantageously in the range between 0.05 mm and 2 mm. Especially good results have been achieved by using resistant layers having a thickness in the range between 0.1 and 0.03 mm.

The resistant layer 8 may be placed over the fabric 5 in different manners. It is preferably placed by means of a calendering step.

An adhesive material may be placed between the fabric 5 and the resistant layer 8 to improve the adhesion of the resistant layer 8 on the fabric 5.

The resistant layer 8 to ensure the required resistance preferably has a weight in the range between 50 and 80 g/m$^2$.

The belts according to the present invention are specifically suitable to be used in systems in direct contact or partially immersed in oil. Specifically, optimal results have been achieved in the case in which the belt is used instead of the traditional gear or chain systems inside the block, systems in which the belt is exposed for its whole lifetime to a continuous contact with oil splashes or possibly even partially immersed in an oil bath.

It has experimentally been verified that the combination of the use of the resistant layer 8 according to the invention enables the tooth belts to pass the duration tests which they undergo for use in motor vehicles therefore avoiding all the problems of the known toothed belts when used in contact with oil, in particular reduction of the mechanical characteristics, reduced adhesion, less efficient meshing and less resistance to wear.

From an analysis of the characteristics of the toothed belt made according to the present invention, the advantages it allows to obtain are apparent.

Specifically, it has unexpectedly been found that, when a coating fabric 5 of a toothed belt is covered with a resistant layer 8 of the previously described type, the resistance to wear of the toothed belt is optimal and, at the same time, during operation the toothed belt has low noise level both at high and low speeds and in the whole range of operating temperatures.

Unexpectedly, in virtue of the improved properties of the resistant layer 8 according to the present invention, the expensive anti-friction material is no longer used and thereby a thinner resistant layer 8 may be applied even maintaining the mechanical and the wear resistance characteristics intact.

Furthermore, without the anti-friction material, a lower modulus and therefore a greater damping is obtained, which leads to achieve toothed belts that, in use, are less noisy with respect to the known ones and in particular to the toothed belts in which the fabric is covered with a resistant layer comprising a fluorinated plastomer or other similar anti-friction materials.

Furthermore, as the resistant layer according to the invention is more compatible with the fabric, the use of an adhesive between the resistant layer and the fabric may be avoided.

While some exemplary embodiments have been described in order to disclose the invention, it is clear that the person skilled in the art may perform modifications without departing from the scope of the present invention. The toothed belt according to the present invention will now also be described by means of examples without because of this being limited thereby.

Example 1

Table 1 shows the characteristics of an elastomeric material in a resistant layer 8 according to the present invention.

TABLE 1

| ZEOFORTE ZSC 2195 H | |
| --- | --- |
| Bound acrylonitrile in weight % | 36 |
| Mooney viscosity MS 1 + 4 ml 100° C. | 88 |
| Specific gravity | 1.24 (g/cm$^3$) |
| Iodine value | 28 |

Example 2

Table 2 shows the chemical composition of a resistant layer 8 made according to the present invention. Such a resistant layer has a thickness of 0.2 mm. Table 2 shows the chemical composition of some examples of a resistant layer 8 made according to the present invention and according to the known art.

TABLE 2

| Ex. | | Anti-friction material |
| --- | --- | --- |
| 1 | Comparative example | Fluorinated plastomer - 125 phr |
| 2 | Example according to the invention | Anti-friction material - 0 phr |

Example 4

FIG. 5 shows the results of the tests performed on a resistant layer according to the invention and comparative with respect to the known art in which the only difference between the belts undergoing the tests is that the example according to the invention is formed by HNBR modified with zinc methacrylate and has no anti-friction material.

The invention claimed is:

1. A toothed belt comprising:
   physical properties for maintaining the belt in an oil wet condition in a timing system, including a body made of a first elastomeric material formed by a mixture of one or more copolymers, obtained from a dien monomer and a nitrile group-containing monomer, and a plurality of teeth; said teeth being coated by a fabric; said fabric being covered by a resistant layer, said resistant layer totally adhering to the fabric and forming in use the working surface of the toothed belt and wherein said resistant layer comprises a vulcanisation agent and more than 85% of a second elastomeric material formed by at least one copolymer modified with an unsaturated carboxylic acid salt and obtained from a dien monomer and a nitrile group-containing monomer,
   wherein said first elastomeric material has an unsaturation level lower than 1%,
   wherein said second elastomeric material is formed by a mixture of one or more copolymers, obtained from a dien monomer and a nitrile-group containing monomer in which the nitrile group-containing monomers are in a percentage in the range between 33% and 49% in weight with respect to total final copolymers,
   wherein said resistant layer contains no anti-friction material, and,
   wherein said resistant layer consists essentially of said second elastomeric material.

2. The toothed belt according to claim 1, wherein said second elastomeric material is HNBR or XHNBR.

3. The toothed belt according to claim 2, wherein said HNBR has an unsaturation level lower that 1%.

4. The toothed belt according to claim 1, wherein said unsaturated carboxylic acid salt is a zinc salt of polymethacrylate or polyacrylate acid.

5. The toothed belt according claim 1, wherein said second elastomeric material is formed by a mixture of one or more copolymers, obtained from a dien monomer and a nitrile-group containing monomer in which the nitrile group-containing monomers are in a percentage in the range between 39 and 44% in weight.

6. The toothed belt according to claim 1, wherein said first elastomeric material is formed by a mixture of one or more copolymers obtained from a dien monomer and a nitrile group-containing monomer in which the nitrile group-containing monomers are in a percentage in the range between 33 and 49% in weight with respect to total final copolymers.

7. The toothed belt according to claim 2, wherein said resistant layer has a weight in the range between 50 and 80 g/m2.

8. The toothed belt according to claim 1, wherein it comprises a peroxide as a vulcanisation agent.

9. A process for the manufacture of a toothed belt according to claim 1, wherein said resistant layer is formed separately from said fabric.

10. The process for the manufacture of a toothed belt according to claim 9 wherein it comprises a step in which said resistant layer is calendered in a first pair of rollers.

11. The process for the manufacture of a toothed belt according to claim 10, wherein it comprises a step in which said resistant layer is joined to said fabric in a second pair of rollers.

12. A resistant layer for covering the fabric of a toothed belt, said resistant layer totally adhering to the fabric and forming in use the working surface of the toothed belt, and wherein said resistant layer comprises a vulcanization agent and more than 85% of an elastomeric material formed by the at least one copolymer modified with an unsaturated carboxylic acid salt and obtained from dien monomer and a nitrile group-containing monomer,
   wherein said elastomeric is formed by a mixture of one or more copolymers obtained from a dien monomer and a nitrile-group containing monomer in which the nitrile group-containing monomers are in a percentage in the range between 33% and 49% in weight with respect to the total final copolymers,
   wherein said resistant layer contains no anti-friction material, and wherein said resistant layer consists essentially of said elastomeric material.

* * * * *